United States Patent [19]

Bretaudeau et al.

[11] Patent Number: 5,018,699
[45] Date of Patent: May 28, 1991

[54] HYDRAULIC ANTIVIBRATORY DEVICES

[75] Inventors: Jean-Pierre Bretaudeau, Chateaudun; Jean-Luc Salaud, Conflans, both of France

[73] Assignee: Hutchinson, France

[21] Appl. No.: 462,490

[22] Filed: Jan. 10, 1990

[30] Foreign Application Priority Data

Jan. 10, 1989 [FR] France ................. 89 00211

[51] Int. Cl.$^5$ ............................................. F16M 5/00
[52] U.S. Cl. ................................... 248/562; 248/638; 267/140.1
[58] Field of Search ............... 248/562, 636, 638, 674, 248/565, 566, 659; 267/140.1, 140.2, 256, 257, 258; 188/321.11

[56] References Cited

U.S. PATENT DOCUMENTS 4,673,156  6/1987  Tabata et al. .................. 248/562 X
4,708,329 11/1987  Tabata et al. .................. 267/140.1

Primary Examiner—Ramon O. Ramirez
Assistant Examiner—Robert A. Olson
Attorney, Agent, or Firm—Larson and Taylor

[57] ABSTRACT

A hydraulic antivibratory support is disclosed for insertion between a vehicle chassis and engine. A protective cover (14) which covers the flexible membrane (7) of the supprot is formed by an integral portion of a rigid intermediate arm (13) adapted for connecting the frame (5) associated with the cover to the crankcase of the engine.

5 Claims, 2 Drawing Sheets

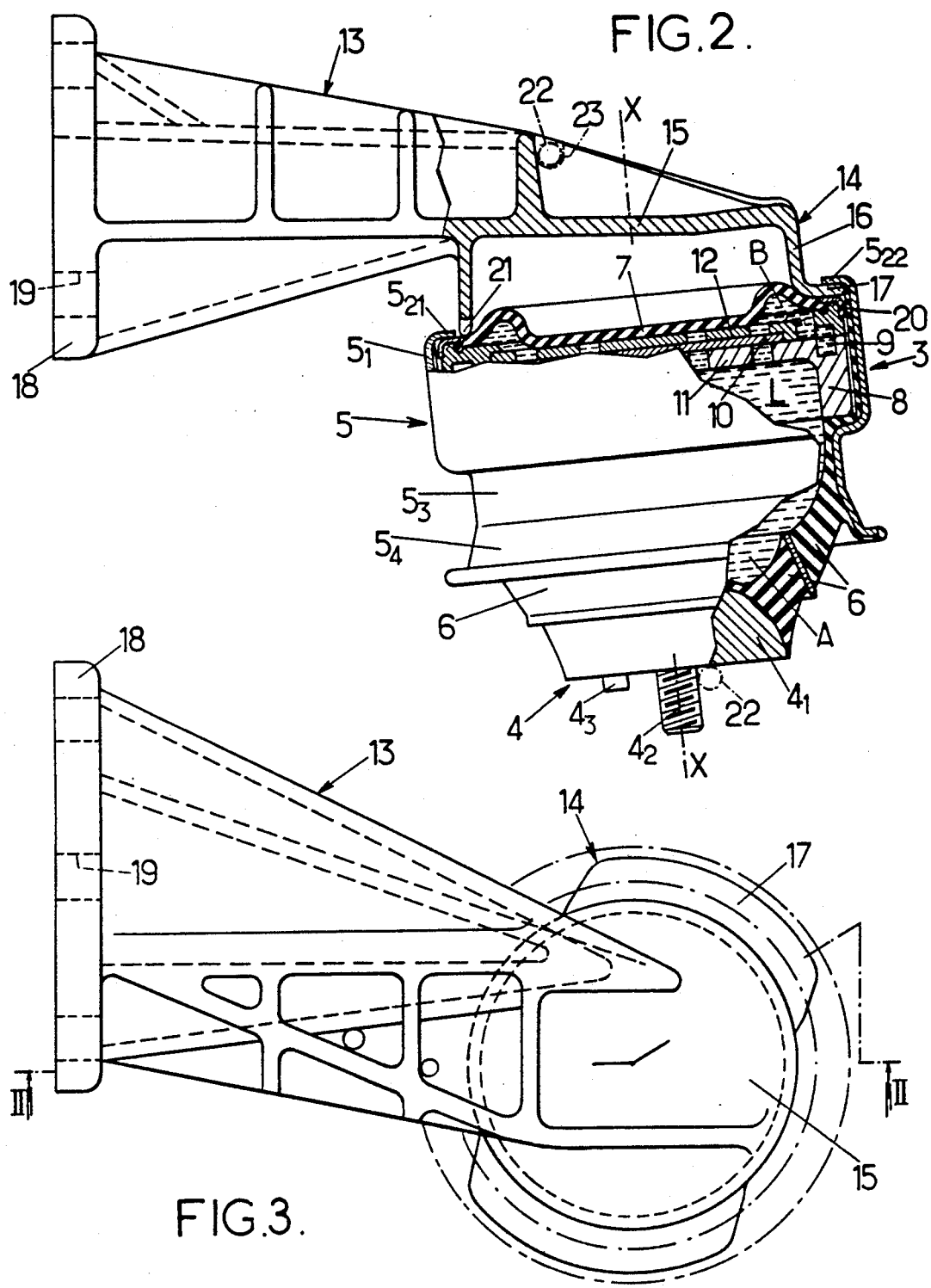

HYDRAULIC ANTIVIBRATORY DEVICES

The invention relates to hydraulic antivibratory devices intended for insertion between two rigid structures, such as a vehicle chassis and engine, for the purposes of damping, connecting and supporting the structures.

BACKGROUND OF THE INVENTION

The invention relates in particular to devices which comprise:

two rigid frames fixed respectively to two rigid structures to be joined together, an annular impervious elastomer partition inserted between the two frames for providing axial compression resistance, the partition and frames forming a first tight deformable chamber, a flexible and impervious membrane carried by one of the frames and forming therewith a second tight deformable chamber, a restricted passage providing permanent communication between the two chambers, and a liquid mass filling the two chambers and the restricted passage.

As is known in such devices, the application on one of the frames in the axial direction of oscillations of relatively large amplitude (generally greater than 0.5 mm) and of relatively low frequency (generally of the order of 5 to 30 Hz) drives liquid back and forth through the passage between the two chambers. The liquid mass resonates when the frequency of the oscillations reaches a critical value, which depends on the ratio between the length and the cross section of the restricted passage. Such resonance provides excellent damping of the above-mentioned oscillations.

In accordance with a further know embodiment, the flexible membrane is covered by a rigid protective cover which is locally apertured so that the volume disposed inside the cover, but outside the membrane, is vented to the open air.

The cover is mounted on a corresponding frame of the device by crimping which ensures the tight assembly of the membrane on the frame.

The two rigid frames forming the device must be mounted on the two rigid structures. This usually requires cumbersome centering and fixing operations involving threaded fittings which are formed, for example, by bolt-nut systems which pass through lugs projecting externally from the cover.

The invention relates more particularly to an embodiment where the rigid frame is fixed to the cover by means of a rigid arm provided on a main bearing or borne structure (such as the crankcase of an engine or the chassis of a vehicle).

With such known embodiments, fixation to the main body or borne structure is generally provided by a screwed fitting between the cover, or the rigid frame to which it is fixed, and one of the ends of the connecting arm and between the other end of the connecting arm and the main structure.

SUMMARY OF THE INVENTION

The purpose of the invention is to simplify the overall assembly of the devices described above and to thereby reduce the cost of such devices.

To this end, a device constructed in accordance with the invention includes a cover formed by an integral portion of the arm.

Thus, there is no need to provide elements, such as lugs, for fixing the arm on the cover. Such elements are provided only at the end of the arm distant from the cover.

In accordance with further embodiments:

the portion of the arm which serves as a cover has the general shape of an open box comprising a flat bottom and a cylindrical edge extended radially outwardly by two flat flanges extending in two diametrically opposite zones and the corresponding frame of the device comprises a cylindrical edge with two diametrically opposite portions bent inwardly on said flexible membrane for sealingly crimping the latter, the other two diametrically opposite portions of said edge being bent back inwardly over the flat flanges of the arm for fixing said frame to said arm, the arm has the general shape of a bracket comprising, at one end, a perforated fixing plate receiving screws of similar, and, at its other end, the cover, which is open in a direction substantially parallel to the mean plane of the plate, in a device according to the two preceding paragraphs, the flat flanges of the cover extend substantially in a diametrical direction perpendicular to the direction corresponding to the largest dimension of the arm so that these flanges are accessible for a crimping machine, or the device is encircled jointingly by at least one inextensible ring forming an axial traction stop and having a section carried by a guide track formed on the arm.

The invention will be better understood from the following description of a particular non-limiting embodiment.

BRIEF DESCRIPTION OF THE DRAWINGS

This description refers to the accompanying drawings in which:

FIGS. 2 and 3 respectively show, on a larger scale, one of the supports of FIG. 1, in a side view in section through II—II of FIG. 3 and in a top view.

DETAILED DESCRIPTION OF THE PREFERRED EMBODIMENT

Figure 1:
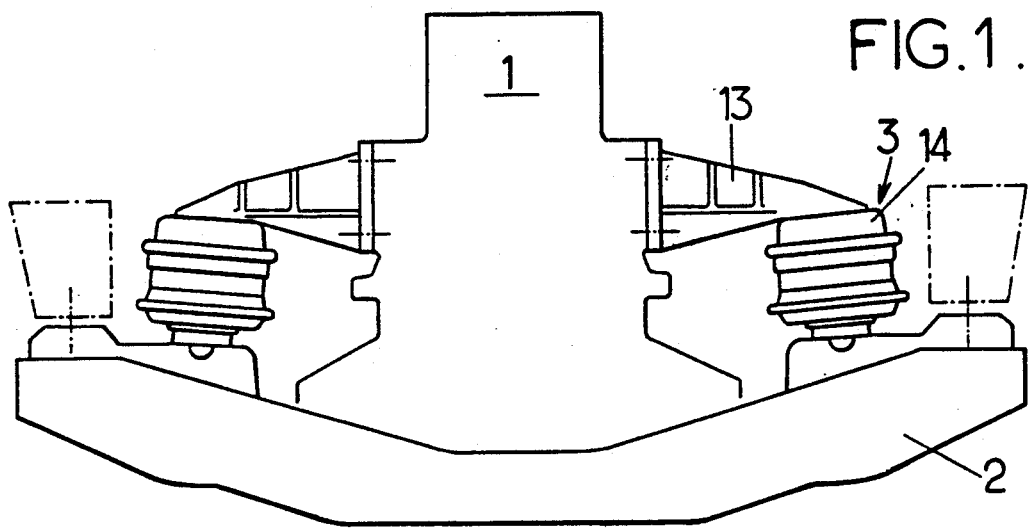
FIG. 1 shows schematically a vehicle engine mounted on a chassis by means of hydraulic supports formed in accordance with the invention.

Referring to FIG. 1, a vehicle engine 1 is mounted on chassis 2, (represented in cross-section in FIG. 1) using at least two hydraulic antivibratory supports which are generally designated 3.

Referring to FIG. 3, each support 3, or conventional design comprises:

a rigid base 4 formed by a central stud $4_1$ extended downwards by a stud bolt $4_2$ and by a centering finger $4_3$, a rigid ring 5 with substantially vertical axis X, the construction of which will be discussed further on, a thick elastomer truncated cone shaped partition 6 with axis X having a good axial compression strength so as to play a "support" role, which connects and seals base 4 to ring 5, a bellows or thin and flexible membrane 7 connected sealingly to ring 5 and defining a closed enclosure with ring 5, partition 6 and base 4, a rigid intermediate partition 8 dividing the enclosure into two chambers, namely a working chamber A on partition 6 side and a compensation chamber B on bellows 7 side, a restricted passage 9 connecting the two chambers A and B together, a liquid mass L filling the two chambers and the restricted passage, and a valve 10 mounted between two grids 11 and 12 forming the partition 8, and mounted such that the amplitude of the axial movements of the valve is limited to a value less than 1 mm and preferably about 0.5 mm.

As is known, the operation of such a support is as follows:

When oscillations of relatively large amplitude (generally greater than 0.5 mm) and of a relatively low frequency F (generally between 5 and 30 Hz) are applied along axis X between base 4 and ring 5, these oscillations cause alternate driving of the liquid L through the restricted passage 9. For a given value of frequency F, which depends essentially on the dimensions of said passage 9, there occurs a resonance effect opposing said oscillations in the liquid column present in this passage.

Furthermore, the presence of valve 10 allows low amplitude high frequency vibrations to be filtered, namely vibrations with an amplitude less than 0.5 mm and a frequency greater than 40 Hz.

In a way also known per se, stud bolt $4_2$ is fixed on an appropriate bearing surface of chassis 2 by cooperation with a nut (not shown).

In known embodiments, a rigid cover is fixed to ring 5 so as to cover the flexible membrane 7 for protective purposes and ring 5 is fixed to the crankcase of engine 1 by a rigid arm 13: for this, a stud bolt (not shown) is for example used which projects upwards from the bottom of the cover.

In other words, in the embodiments in question, the cover must be fixed both to device 3 and to arm 13 by two distinct operations which are both independent of the fitting of the arm to the crankcase.

The invention makes it possible to omit the operation of fixing the cover on the arm.

For this, according to the invention, cover 14 forms an integral part of arm 13.

In preferred embodiments, such as the one illustrated in the figure, cover 14 is integrally moulded with arm 13, forming therewith a single cast metal part.

More precisely, cover 14 here comprises a substantially flat bottom 15 and a cylindrical edge 16 which is extended externally by two flat flanges 17 each extending over an arc of about 90° and disposed respectively in two diametrically opposite zones of the cover.

Arm 13 has the general form of a ribbed bracket having one relatively narrow end which is extended by cover 14 which is open downwards and whose other widened extremity ends in a fixing plate 18 itself perforated with apertures 19 for receiving screws or similar fixing members.

The rigid ring 5 is formed by a metal collar which comprises:

a metal section $5_1$ jointingly surrounding partition 8, an edge $5_2$ which extends section $5_1$ upwards and is initially cylindrical over the whole of its periphery, and a restricted neck $5_3$ which extends section $5_1$ downwards and ends in a divergent truncated cone-shaped skirt $5_4$ to which partition 6 adheres, Edge $5_2$ comprises:

on one end, two first diametrically opposite segments $5_{21}$ intended to be bent inwardly against the periphery of membrane 7, which is strengthened by an indeformable washer 20 having, for example, an L profile. The bending of segments $5_{21}$ results in a crimped seal of membrane 7 against partition 8, and two second segments $5_{22}$ interposed between the first two segments $5_{21}$ for crimping supporting assembly 3 on arm 13 by being bent inwards against the flat flanges 17 of arm 13.

Figure 4:
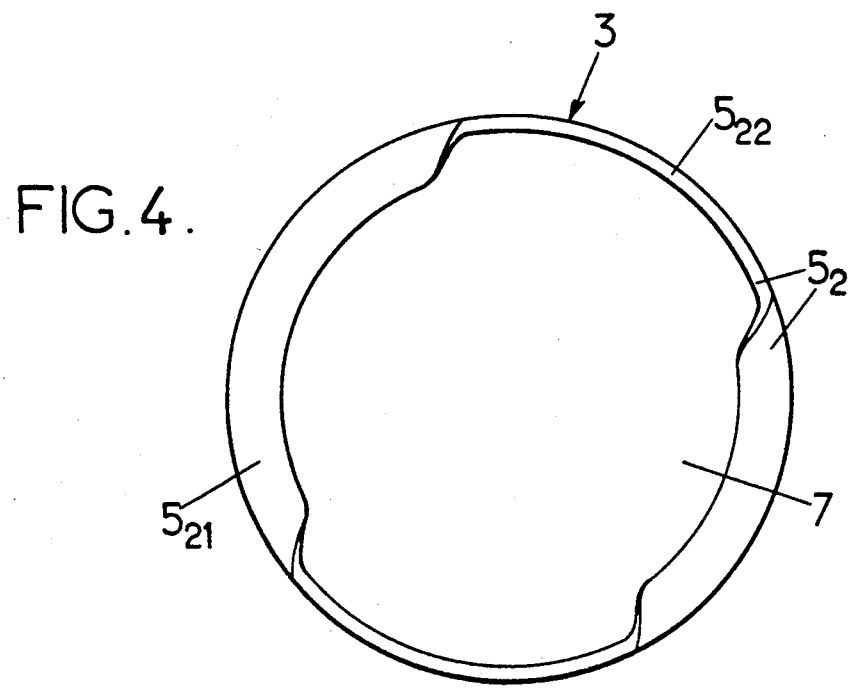
FIG. 4 shows, in a top view, a component of the above described device in an intermediate assembly phase.

FIG. 4 shows support 3 seen from above, after the crimping of membrane 7, but before support 3 is fitted to the one-piece arm 13-cover 14 assembly.

In this configuration, support 3 is filled with damping liquid L.

As can be seen in FIGS. 3 and 4, the angular extent of segments $5_{22}$ correspond to those of flanges 17 on which they are to be bent back.

It may also be noted that segments $5_{22}$ are not strictly diametrically opposite, the other two segments $5_{21}$ extending over different arcs, which are 74° and 106° respectively.

As can be seen in FIG. 3, this slight angular shift, as well as the general orientation of flanges 17, which corresponds to a direction perpendicular to the large dimension of the arm, completely frees the vertical approaches of flanges 17 with respect to the rest of arm 13, and thus flanges 17 are completely accessible for crimping machines such as those which operate by knurling or rolling.

It can be further seen in FIG. 2 that the height of edge 16 of cover 14 is shortened, at least locally, in portions other than those extended by flanges 17, which makes it possible to form apertures 21 for venting the inside of this cover.

As is evident from the above description, the invention was not limited to the embodiments and modes of application described above; it embraces, on the contrary, all variants thereof.

In particular, if the design of arm 13 and the design of the crimping machine made it possible to bend back the whole of the cylindrical edge $5_2$ in a single pass when support 3 is juxtaposed against cover 14, a single crimping operation will suffice for fitting membrane 7 and cover 14 on the rest of the support: in this case, the partial flanges 17 of the preceding embodiment may be replaced by a single continuous flange or flap. This variant simplifies fitting and assumes that the support is filled with liquid after the arm has been fitted thereon.

Moreover, a rigid ring 22 can be used to encircle support 3 (FIG. 2) and arm 13 to prevent possible tearing of support 3 with a groove 23 formed in arm 13 for receiving and guiding rigid ring 22. Further, as compared with a simple cover having fixing elements, arm 13 has more possible locations for tracks 23 to receive rigid ring 22.

We claim:

1. Hydraulic antivibratory device intended to be inserted for damping and connecting purposes between first and second rigid structures, said device comprising;

first and second rigid frames which can be fixed respectively to said first and second rigid structures, an annular impervious elastomer partition inserted between said first and second frames for providing axial compression resistance, said partition forming a first tight deformable chamber with said first and second frames, a flexible and impervious membrane carried by said first frame and forming therewith a second tight deformable chamber, a restricted passage providing permanent communication between said first and second chambers, a liquid mass filling said first and second chambers and said restricted passage, and a rigid protective cover covering said membrane and fixed to said first frame, wherein said cover is formed by an integral one piece portion of a rigid intermediate arm adapted for connecting said first frame to said first rigid structure.

2. Device according to claim 1, wherein said arm has the general shape of a bracket comprising at a first end, a fixing plate perforated for receiving screws and comprising at a second end said cover and parallel wherein said cover is open in a direction substantially to said plate.

3. Device according to claim 1, wherein said device is encircled by at least one rigid ring connecting said arm with said second rigid same.

4. Device according to claim 1, wherein said cover has the general shape of an open box, comprising:

a flat bottom, a cylindrical edge extended radially outwardly by two flat diametrically opposite flanges, and wherein said first frame comprises, a cylindrical edge having two first diametrically opposite portions bent inwardly on said flexible membrane for sealingly crimping said membrane, and having two second diametrically opposite portions bent inwardly over said flanges of said arm for fixing said frame to said arm.

5. Device according to claim 4, wherein said flat flanges of said cover extend substantially in a diametrical direction perpendicular to a direction corresponding to the largest dimension of said arm.

* * * * *